Patented Nov. 15, 1927.

1,649,386

UNITED STATES PATENT OFFICE.

HENRY BLUMENBERG, JR., OF MOAPA, NEVADA.

FILTERING MATERIAL AND METHOD OF MAKING THE SAME.

No Drawing.   Application filed April 14, 1927.   Serial No. 183,922.

My invention relates to a filtering material and method of making the same.

It is an object of this invention to provide a filtering material especially adapted for the treatment of distilled mineral oil products such as kerosene, distillate and gasoline, and in particular for the removal of sulphur compounds therefrom.

The filtering material consists of a finely divided fluffy porous cellular material intimately associated with lead oxide.

My invention consists of the product and the method of making the same hereinafter described and claimed.

I take litharge PbO and grind the same through a 300 mesh screen and mix the same with water, taking 5 to 10 per cent of the litharge, and stirring the same in water to form a thin slurry. To this slurry I add sawdust, taking 1 part of sawdust to 2 to 3 parts slurry and form an intimate mixture therewith. The mixture is then carefully heated to a temperature of 380 to 400° F. care being taken not to exceed this temperature, for the object is to dehydrate the mixture and carbonize the sawdust without reducing the lead oxide to metallic lead. The resulting product is an extremely fluffy, dark colored carbonaceous material intimately associated with lead oxide.

In the use of the filtering material 5 to 10 per cent by weight of the same is added to distilled mineral oil product such as kerosene, distillate or gasoline, and the mixture is agitated and preferably heated from 40 to 50° C. for one hour and then filtered. The filtering material is found to be very efficient in removing sulphur and other impurities from the mineral oil products.

In place of the sawdust any other cellulose material, such as ground corncobs, husks, rice hulls and the like, also diatomaceous earth, may be used.

In place of litharge, lead hydroxide or any other lead compound which, on heating, may be reduced to lead oxide, may be used.

It will be understood that various changes may be made by those skilled in the art without departing from the spirit of my invention as claimed.

I claim:

1. A filtering material consisting of a fluffy porous cellular material intimately associated with lead oxide.

2. A filtering material consisting of carbonized cellulose material intimately associated with lead oxide.

3. A filtering material consisting of finely divided carbonized sawdust intimately associated with lead oxide.

4. A method of making a filtering material comprising forming a thin slurry with a lead compound which, on heating, will be reduced to lead oxide, with water, mixing a porous cellular material therewith and heating the mixture to a temperature not exceeding the reduction temperature of lead oxide.

5. A method of making a filtering material comprising mixing lead oxide with water to form a thin slurry, mixing sawdust therewith and heating the mixture to a temperature of carbonization of the sawdust but below the reduction temperature of lead oxide.

6. A method of making a filtering material comprising mixing finely ground lead oxide in the proportion of 5 to 10 per cent with water to form a thin slurry, mixing sawdust therewith in the proportion of 2 to 3 parts of sawdust to 1 part of slurry and heating the mixture to a temperature of 380 to 400° F.

In testimony whereof I have signed my name to this specification.

HENRY BLUMENBERG, JR.